(12) United States Patent
Liu

(10) Patent No.: US 10,574,092 B2
(45) Date of Patent: Feb. 25, 2020

(54) WIRELESS POWER TRANSMITTER CIRCUIT AND CONTROL CIRCUIT AND CONTROL METHOD THEREOF

(71) Applicant: RICHTEK TECHNOLOGY CORPORATION, Zhubei, HsinChu (TW)

(72) Inventor: Kuo-Chi Liu, Hsiinchu (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 230 days.

(21) Appl. No.: 15/611,210

(22) Filed: Jun. 1, 2017

(65) Prior Publication Data

US 2018/0212468 A1    Jul. 26, 2018

(30) Foreign Application Priority Data

Jan. 20, 2017    (CN) .......................... 2017 1 0049465

(51) Int. Cl.
*H02J 50/12*    (2016.01)
*H02M 7/44*    (2006.01)
*H02M 7/48*    (2007.01)

(52) U.S. Cl.
CPC .............. *H02J 50/12* (2016.02); *H02M 7/44* (2013.01); *H02M 7/48* (2013.01)

(58) Field of Classification Search
CPC ....................................................... H02M 7/44
See application file for complete search history.

(56) References Cited

U.S. PATENT DOCUMENTS 9,391,461 B2 *   7/2016   Kim ...................... H02J 50/90
2014/0084858 A1 *  3/2014   Kim ...................... H02J 7/025
                                                            320/108

FOREIGN PATENT DOCUMENTS

EP    3223418 A1 *  9/2017  ............ H02M 3/156

* cited by examiner

*Primary Examiner* — Jared Fureman
*Assistant Examiner* — Emmanuel Dominique
(74) *Attorney, Agent, or Firm* — Tung & Associates (57) ABSTRACT

The present invention provides a wireless power transmitter circuit which includes a power converter circuit, a power inverter circuit, a resonant transmitter circuit and a power control circuit. The power conversion circuit converts an input power to a conversion output power which includes a conversion output voltage. The power inverter circuit converts the conversion output power to an AC output power. The resonant transmitter circuit converts the AC output power to a resonant wireless power. The power control circuit generates a current reference signal according to the conversion output voltage, and generates a conversion control signal according to a difference between the current reference signal and a resonant current related signal, to control the power converter circuit such that the resonant wireless power is regulated substantially at a predetermined power level.

21 Claims, 4 Drawing Sheets

WIRELESS POWER TRANSMITTER CIRCUIT AND CONTROL CIRCUIT AND CONTROL METHOD THEREOF

CROSS REFERENCE

The present invention claims priority to CN 201710049465.X, filed on Jan. 20, 2017.

BACKGROUND OF THE INVENTION

Field of Invention

The present invention relates to a wireless power transmitter circuit, and particularly to a constant power wireless power transmitter circuit. The present invention also relates to a control circuit and a control method for use in the wireless power transmitter circuit.

Description of Related Art

Figure 1:
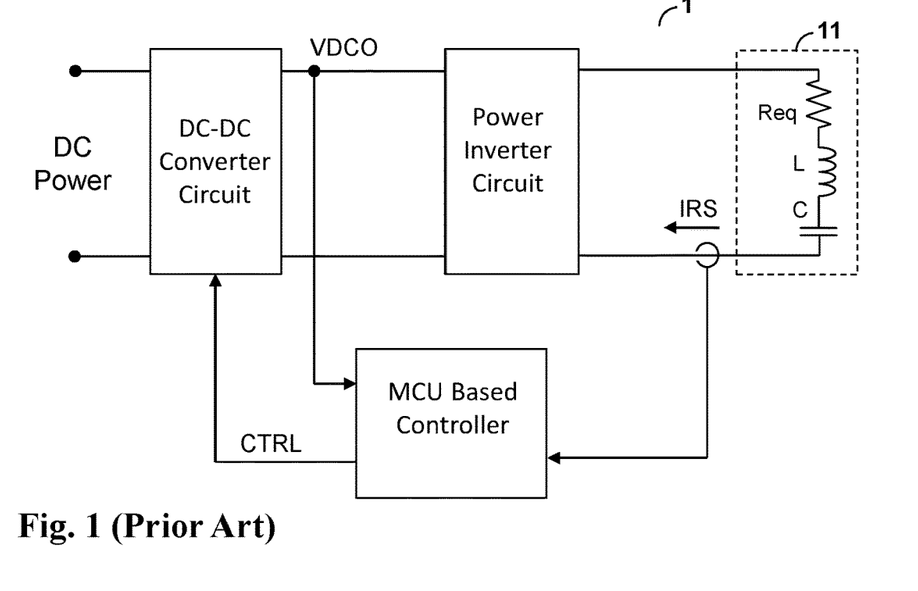
FIG. 1 shows a schematic diagram of a prior art wireless power transmitter circuit.

In general, it is required for a wireless power transmitter circuit to be able to operate under constant current control in normal operation, and to be switched to operate under constant power control when the input power or output power is overly high to avoid damage to the wireless power transmitter circuit itself or other circuits receiving power from it. FIG. 1 shows a prior art wireless power transmitter circuit (wireless power transmitter circuit 1) which comprises a DC-DC conversion circuit, a power inverter circuit, a resonant transmitter circuit 11 and a MCU (micro-controller unit) based controller. The DC-DC conversion circuit converts a DC power to a conversion output voltage VDCO. The power inverter circuit converts the conversion output voltage to an AC output power. The resonant transmitter circuit 11 converts the AC output power to a resonant wireless power to be transmitted in a wireless manner. The MCU based controller generates a conversion control signal CTRL according to the conversion output voltage VDCO and a resonant current IRS, to control the DC-DC conversion circuit such that the wireless power transmitter circuit 1 operates in a constant current mode or a constant power mode.

The prior art circuit in FIG. 1 has a drawback as thus. The MCU based controller needs an ADC (analog-to-digital converter) to convert the measured voltage and current to digital signals for calculating the power or current, and the calculated result is converted to a conversion control signal by a DAC (digital-to-analog converter). As the demands of the accuracy, the sampling rate and computation speed are getting higher and higher, the requirements for the ADC, DAC and MCU are also getting higher, which leads to higher cost and more complexity in circuit design.

Compared to the prior art in FIG. 1, the present invention is advantageous in that the present invention can operate in a constant current mode or a constant power mode by analog control, with advantages of simpler circuit architecture, faster response and lower cost.

SUMMARY OF THE INVENTION

From one perspective, the present invention provides a wireless power transmitter circuit, comprising: a power conversion circuit, configured to operably convert an input power to a conversion output power, wherein the conversion output power includes a conversion output voltage; a power inverter circuit, configured to operably convert the conversion output power to an AC output power, wherein the AC output power includes an AC output current; a resonant transmitter circuit which includes at least a transmitter coil, and is configured to operably convert the AC output power to a resonant wireless power, wherein the resonant transmitter circuit has a resonant current; and a power control circuit, configured to operably generate a current reference signal according to the conversion output voltage, and generate a conversion control signal according to a difference between the current reference signal and a signal related to the resonant current (resonant current related signal), so as to control the power conversion circuit by the conversion control signal to regulate the resonant wireless power substantially at a predetermined first power level.

In one embodiment, the power control circuit includes: a current reference signal generator circuit, configured to operably generate the current reference signal according to a reference voltage and the conversion output voltage; and a conversion control signal generator circuit, configured to operably generate the conversion control signal according to a difference between the current reference signal and the resonant current related signal.

From one perspective, the present invention provides a wireless power transmitter circuit, comprising: a power conversion circuit, configured to operably convert an input power to a conversion output power, wherein the conversion output power includes a conversion output voltage; a power inverter circuit, configured to operably convert the conversion output power to an AC output power, wherein the AC output power includes an AC output current; a resonant transmitter circuit which includes at least a transmitter coil, and is configured to operably convert the AC output power to a resonant wireless power, wherein the resonant transmitter circuit has a resonant current; and a power control circuit, configured to operably generate a voltage reference signal according to a resonant current related signal, and generate a conversion control signal according to a difference between the voltage reference signal and the conversion output voltage, so as to control the power conversion circuit by the conversion control signal to regulate the resonant wireless power substantially at a predetermined first power level.

In one embodiment, the power control circuit includes: a voltage reference signal generator circuit, configured to operably generate the voltage reference signal according to a reference current signal and the resonant current related signal; and a conversion control signal generator circuit, configured to operably generate the conversion control signal according to a difference between the voltage reference signal and the conversion output voltage.

In one embodiment, the resonant current decreases when the conversion output voltage increases, and the resonant current increases when the conversion output voltage decreases.

In one embodiment, the conversion control signal controls the power conversion circuit to regulate the AC output power or the conversion output power substantially at a predetermined second power level which is related to the first power level.

In one embodiment, the power conversion circuit is a switching buck converter circuit, a switching boost converter circuit, a switching buck-boost converter circuit, or an AC-DC converter circuit.

In one embodiment, the power inverter circuit is a class D inverter circuit, or a class E inverter circuit.

In one embodiment, the conversion control signal controls the power conversion circuit to regulate the resonant current or the AC output current substantially at a predetermined current level when the conversion output voltage is lower than a predetermined voltage threshold.

In one embodiment, the power control circuit includes: a transconductance amplifier circuit, configured to operably generate a transconductance amplification output signal according to a reference voltage and the conversion output voltage; a unidirectional conductive device, having a current output terminal which is coupled to the transconductance amplification output signal, and having a current input terminal at which the current reference signal is generated; and a signal amplifier circuit, configured to operably generate the conversion control signal according to a difference between the current reference signal and the resonant current related signal.

In one embodiment, the predetermined voltage threshold is the reference voltage.

In one embodiment, the conversion control signal controls the power conversion circuit to regulate the resonant current or the AC output current substantially at a predetermined current level when the conversion output voltage is lower than a predetermined voltage threshold.

From another perspective, the present invention provides a power control circuit, configured to operably control a wireless power transmitter circuit which comprises: a power conversion circuit, configured to operably convert an input power to a conversion output power, wherein the conversion output power includes a conversion output voltage; a power inverter circuit, configured to operably convert the conversion output power to an AC output power, wherein the AC output power includes an AC output current; and a resonant transmitter circuit which includes at least a transmitter coil, and is configured to operably convert the AC output power to a resonant wireless power, wherein the resonant transmitter circuit has a resonant current; the power control circuit comprising: a current reference signal generator circuit, configured to operably generate a current reference signal according to a reference voltage and the conversion output voltage; and a conversion control signal generator circuit, configured to operably generate a conversion control signal according to a difference between the current reference signal and a signal related to the resonant current (resonant current related signal), so as to control the power conversion circuit by the conversion control signal to regulate the resonant wireless power substantially at a predetermined first power level.

From another perspective, the present invention provides a power control circuit, configured to operably control a wireless power transmitter circuit which comprises: a power conversion circuit, configured to operably convert an input power to a conversion output power, wherein the conversion output power includes a conversion output voltage; a power inverter circuit, configured to operably convert the conversion output power to an AC output power, wherein the AC output power includes an AC output current; and a resonant transmitter circuit which includes at least a transmitter coil, and is configured to operably convert the AC output power to a resonant wireless power, wherein the resonant transmitter circuit has a resonant current; the power control circuit including: a voltage reference signal generator circuit, configured to operably generate a voltage reference signal according to a reference current signal and the resonant current related signal; and a conversion control signal generator circuit, configured to operably generate the conversion control signal according to a difference between the voltage reference signal and the conversion output voltage, so as to control the power conversion circuit by the conversion control signal to regulate the resonant wireless power substantially at a predetermined first power level.

In one embodiment, the resonant current decreases when the conversion output voltage increases, and the resonant current increases when the conversion output voltage decreases.

In one embodiment, the current reference signal generator circuit includes: a transconductance amplifier circuit, configured to operably generate a transconductance amplification output signal according to a reference voltage and the conversion output voltage; a unidirectional conductive device, having a current output terminal which is coupled to the transconductance amplification output signal, and having a current input terminal at which the current reference signal is generated; and a signal amplifier circuit, configured to operably generate the conversion control signal according to a difference between the current reference signal and the resonant current related signal.

From another perspective, the present invention provides a control method, for use in controlling a wireless power transmitter circuit which comprises: a power conversion circuit, configured to operably convert an input power to a conversion output power, wherein the conversion output power includes a conversion output voltage; a power inverter circuit, configured to operably convert the conversion output power to an AC output power, wherein the AC output power includes an AC output current; and a resonant transmitter circuit which includes at least a transmitter coil, and is configured to operably convert the AC output power to a resonant wireless power, wherein the resonant transmitter circuit has a resonant current; the control method comprising: generating a current reference signal according to the conversion output voltage; generating a conversion control signal according to a difference between the current reference signal and a resonant current related signal; and controlling the power conversion circuit by the conversion control signal to regulate the resonant wireless power substantially at a predetermined first power level.

From another perspective, the present invention provides a control method, for use in controlling a wireless power transmitter circuit which comprises: a power conversion circuit, configured to operably convert an input power to a conversion output power, wherein the conversion output power includes a conversion output voltage; a power inverter circuit, configured to operably convert the conversion output power to an AC output power, wherein the AC output power includes an AC output current; and a resonant transmitter circuit which includes at least a transmitter coil, and is configured to operably convert the AC output power to a resonant wireless power, wherein the resonant transmitter circuit has a resonant current; the control method comprising: generating a voltage reference signal according to a signal related to the resonant current; generating a conversion control signal according to a difference between the voltage reference signal and the conversion output voltage; and controlling the power conversion circuit by the conversion control signal to regulate the resonant wireless power substantially at a predetermined first power level.

In one embodiment, the resonant current decreases when the conversion output voltage increases, and the resonant current increases when the conversion output voltage decreases.

In one embodiment, the step of generating the current reference signal includes: generating an amplification output signal according to a difference between a reference voltage and the conversion output voltage; and generating the current reference signal by unidirectionally conducting the amplification output signal.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 2:
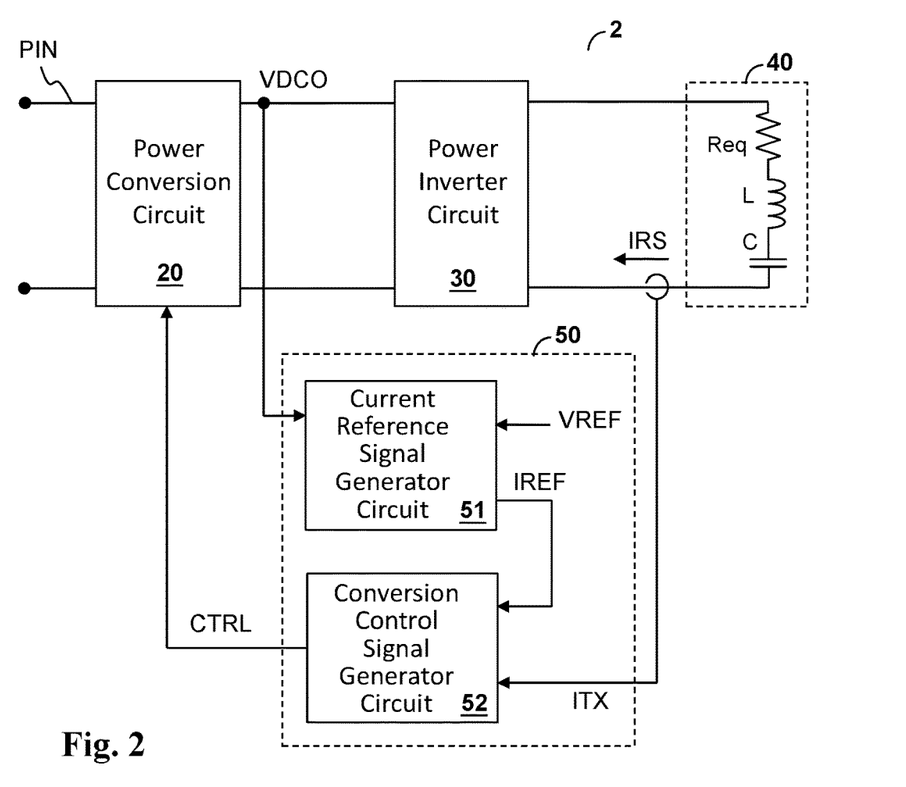
FIG. 2 shows a schematic diagram of an embodiment of the wireless power transmitter circuit according to the present invention.

FIG. 2 shows one embodiment of the wireless power transmitter circuit according to the present invention (wireless power transmitter circuit 2), wherein the wireless power transmitter circuit 2 comprises a power conversion circuit 20, a power inverter circuit 30, a resonant transmitter circuit 40, and a power control circuit 50. The power conversion circuit 20 converts an input power PIN to a conversion output power, wherein the conversion output power includes a conversion output voltage VDCO. The input power PIN may be an AC power or a DC power, and the power conversion circuit 20 may correspondingly be an AC-DC converter circuit or a DC-DC converter circuit. The power inverter circuit 30 converts the conversion output power to an AC output power PACO, wherein the AC output power PACO includes an AC output current IAC. The resonant transmitter circuit 40 has a resonant current IRS. In this embodiment, the resonant transmitter circuit 40 includes a transmitter coil L and a resonant capacitor C which are connected in series. Note that the resonant transmitter circuit structure is not limited to the one shown in this embodiment, and may be realized by resonant circuits in other forms, for example but not limited to a parallel type resonant circuit, or combinations of parallel and series type resonant circuits. The power control circuit 50 generates a current reference signal IREF according to the conversion output voltage VDCO, and generates a conversion control signal CTRL according to a difference between the current reference signal IREF and a signal related to the resonant current IRS (resonant current related signal ITX), so as to control the power conversion circuit 20 by the conversion control signal CTRL to regulate the resonant wireless power POUT substantially at a predetermined first power level such that the wireless power transmitter circuit 2 operates in the constant power mode. The resonant current related signal ITX can be obtained by a current sensing circuit which senses the resonant current IRS.

The term "predetermined" as used in the context of this invention, such as the "predetermined first power level" may be a fixed value or an adjustable variable. Also note that, although it is preferred to regulate the resonant wireless power POUT exactly at the predetermined first power level, however due to non-idealities caused by for example imperfection of components or imperfect matching among components, the level of the actual resonant wireless power POUT may not be exactly equal to the first power level, but just close to the first power level, so the term "substantially" means that there is an allowable tolerance range.

Still referring FIG. 2, in one embodiment, the power control circuit includes a current reference signal generator circuit 51, and a conversion control signal generator circuit 52. The current reference signal generator circuit 51 generates the current reference signal IREF according to a reference voltage VREF and the conversion output voltage VDCO. The conversion control signal generator circuit 52 generates the conversion control signal CTRL according to a difference between the current reference signal IREF and the resonant current related signal ITX.

Still referring FIG. 2, in one embodiment, under control by the power control circuit 50, the resonant current IRS decreases when the conversion output voltage VDCO increases, and the resonant current IRS increases when the conversion output voltage VDCO decreases, whereby the constant power mode is achieved.

Still referring FIG. 2, in one embodiment, the conversion control signal CTRL controls the power conversion circuit 20 to regulate the AC output power PACO of the power inverter circuit 30 substantially at a predetermined second power level which is related to the first power level. In one preferred embodiment, the power loss of each circuit is ignorable or substantially a constant value, so the level of the resonant wireless power POUT can also maintains substantially at the first power level when the AC output power is regulated substantially at the predetermined second power level, whereby the wireless power transmitter circuit 2 operates in the constant power mode. In another embodiment, the conversion control signal CTRL controls the power conversion circuit 20 to regulate the conversion output power substantially at a predetermined third power level which is related to the first power level. In one preferred embodiment, the power loss of each circuit is ignorable or substantially a constant value, so the level of the resonant wireless power POUT can also maintains substantially at the first power level when the conversion output power is regulated substantially at the predetermined third power level, whereby the wireless power transmitter circuit 2 operates in the constant power mode.

In some embodiments of the wireless power transmitter circuit of the present invention, according to different requirements such as the voltage ranges of the input power PIN and the conversion output voltage VDCO, the power conversion circuit 20 may be a switching buck converter circuit, a switching boost converter circuit, or a switching buck-boost converter circuit, for converting the input power PIN with step-down conversion, step-up conversion, or buck-boost conversion to generate the conversion output voltage VDCO. In one embodiment, the power conversion circuit 20 may be an AC-DC converter circuit for converting the input power PIN in an AC form.

In some embodiments of the wireless power transmitter circuit of the present invention, according to different requirements, the power inverter circuit 30 may be a class D inverter circuit, or a class E inverter circuit.

Figure 3:
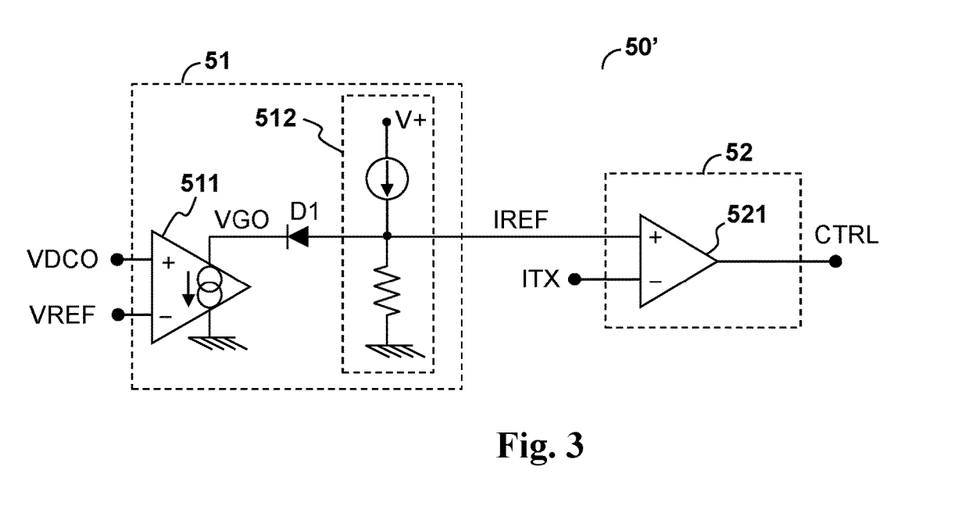
FIG. 3 shows a schematic diagram of an embodiment of the power control circuit of the wireless power transmitter circuit according to the present invention.

FIG. 3 shows one embodiment of the power control circuit (power control circuit 50') of the wireless power transmitter circuit according to the present invention, wherein the power control circuit 50' includes a voltage reference signal generator circuit 51, and a conversion control signal generator circuit 52. The voltage reference signal generator circuit 51 includes a transconductance amplifier circuit 511 and a unidirectional conduction device D1, which is a diode D1 in this embodiment. The transconductance amplifier circuit 511 generates a transconductance amplification output signal VGO according to a reference voltage VREF and the conversion output voltage VDCO. A current output terminal of the diode D1 is coupled to the transconductance amplification output signal VGO. The diode D1 generates the current reference signal IREF on a current input terminal of the diode D1 by shunting the current input terminal of the diode D1 to a current-voltage conversion circuit 512. The conversion control signal generator circuit 52 includes a signal amplifier circuit 521. In this embodiment, by means of the unidirectional conduction characteristic of the diode D1, when the conversion output voltage VDCO is lower than the reference voltage VREF, the current reference signal IREF is a predetermined reference voltage, while when the conversion output voltage VDCO is higher than the reference voltage VREF, and the current reference signal IREF varies according to the difference between the conversion output voltage VDCO and the voltage reference VREF, wherein the current reference signal IREF decreases when the difference between the conversion output voltage VDCO and the voltage reference VREF increases, and the current reference signal IREF increases when the difference between the conversion output voltage VDCO and the voltage reference VREF decreases. The signal amplifier circuit 521 generates the conversion control signal CTRL according to the difference between the current reference signal IREF and the resonant current related signal ITX, such that the resonant current IRS is regulated substantially at a predetermined current level when the conversion output voltage VDCO is lower than the reference voltage VREF (in this case the current reference IREF is the predetermined reference voltage), whereby the wireless power transmitter circuit 2 operates in the constant current mode. On the other hand, when the conversion output voltage VDCO is higher than the reference voltage VREF, the resonant current IRS decreases when the conversion output voltage VDCO increases and the resonant current IRS increases when the conversion output voltage VDCO decreases, therefore the resonant wireless power POUT is regulated substantially at the aforementioned predetermined first power level such that the wireless power transmitter circuit 2 operates in the constant output power mode. Note that the reference voltage VREF may be a fixed value, or an adjustable variable.

Note that the targets to be regulated are resonant current IRS and the resonant wireless power POUT in the aforementioned embodiment; however, it is not limited to regulating these targets according to the spirit of the present invention. In one embodiment, such as the embodiment shown in FIG. 3, the wireless power transmitter circuit can alternatively regulate the AC output current IAC substantially at a predetermined current level when the conversion output voltage VDCO is lower than the reference voltage VREF, such that the wireless power transmitter circuit operates in the constant current mode, and regulate the AC output power PACO substantially at the aforementioned predetermined second power level when the conversion output voltage VDCO is higher than the reference voltage VREF, such that the wireless power transmitter circuit 2 operates in the constant power mode. Besides, the reference voltage VREF is used as the threshold to switch (to determine the boundary) between the constant power mode and the constant current mode. However, the present invention is not limited to this arrangement. In one embodiment, the power control circuit 50' may determine whether the wireless power transmitter circuit should operate in the constant power mode or the constant current mode according to a predetermined voltage threshold VTH.

Note that the wireless power transmitter circuit of the present invention uses an analog control scheme, so compared to the prior art circuits, the present invention is advantageous in achieving the aforementioned operations in a continuous (non-step-wise) and analog manner, with a faster response, and a lower cost due to simpler circuitry.

Figure 4:
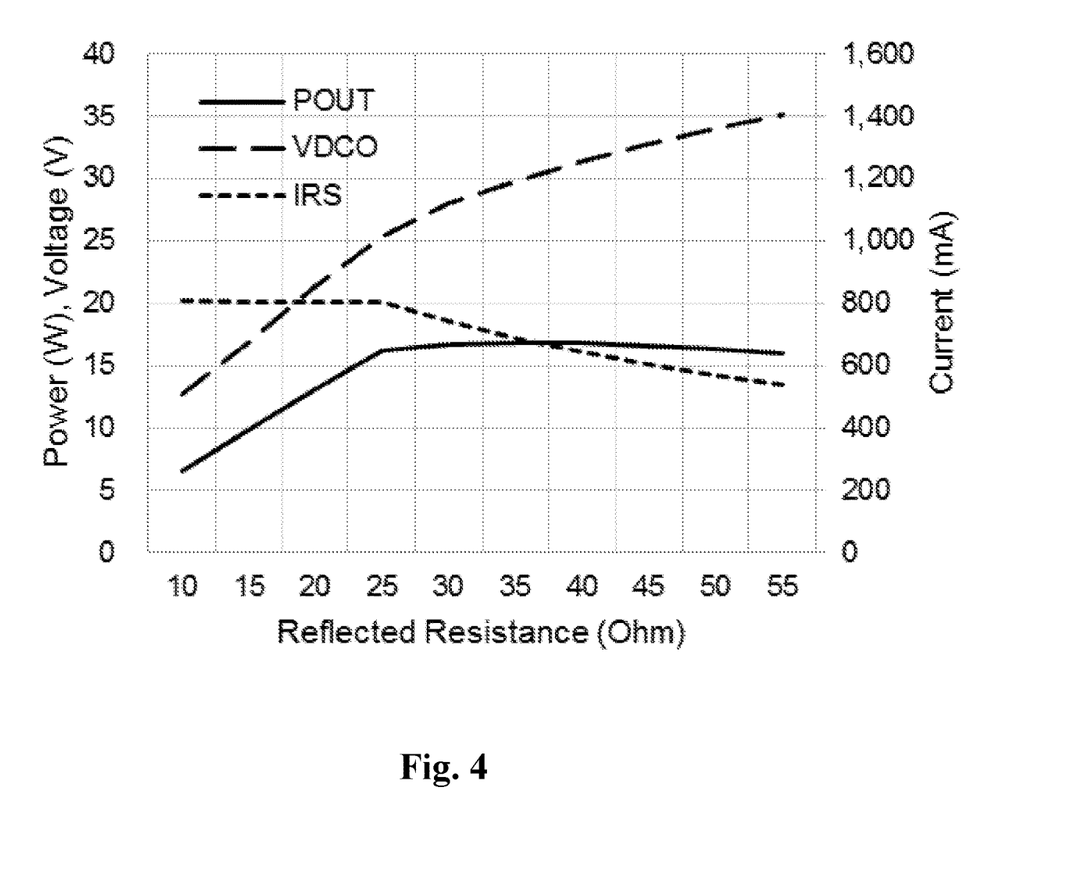
FIG. 4 shows simulation characteristic curves corresponding to the embodiments shown in FIGS. 2 and 3.

Please refer to FIG. 4 which shows simulation characteristic curves corresponding to the embodiments as shown in FIGS. 2 and 3. In the embodiment shown in FIG. 4, when the reflected resistance (i.e. the real part of the reflected impedance of the resonant transmitter circuit, as represented by Req as shown in FIG. 2) of the resonant transmitter circuit (e.g. the resonant transmitter circuit 40 in FIG. 2) is lower than 25 ohm, the wireless power transmitter operates in the constant current mode, wherein the resonant current IRS (the short dashed line as shown in the figure) is regulated substantially at a predetermined current level (e.g. 800 mA as shown in the figure). And when the reflected resistance is higher than 25 ohm, the wireless power transmitter operates in the constant power mode, wherein the resonant wireless power POUT (the solid line as shown in the figure) is regulated substantially at the aforementioned predetermined first power level (e.g. 16 W as shown in the figure).

Note that in this embodiment, the reflected resistance is the independent variable and the current and the power of the wireless are measured and observed dependently, and the boundary between the constant current mode operation and the constant power mode operation is determined by a threshold of the reflected resistance. Nevertheless, since the conversion output voltage VDCO (the long dashed line shown in the figure) is substantially proportional to the reflected resistance because of the control scheme of the wireless power transmitter circuit of the present invention, to determine the boundary between the constant current mode operation and the constant power mode operation by a threshold of the reflected resistance is equivalent to determining the boundary by a predetermined voltage threshold (for example 25V, which corresponds to the aforementioned reference voltage VREF, as shown in FIG. 4). In this case, the embodiment shown in FIG. 4 can be re-described accordingly as when the conversion output voltage VDCO is lower than 25 V, the wireless power transmitter operates in the constant current mode, wherein the resonant current IRS is regulated substantially at a predetermined current level (e.g. 800 mA as shown in the figure), and when the conversion output voltage VDCO is higher than 25V, the wireless power transmitter operates in the constant power mode, wherein the resonant wireless power POUT is regulated substantially at the aforementioned predetermined first power level (e.g. 16 W as shown in the figure).

Figure 5A:
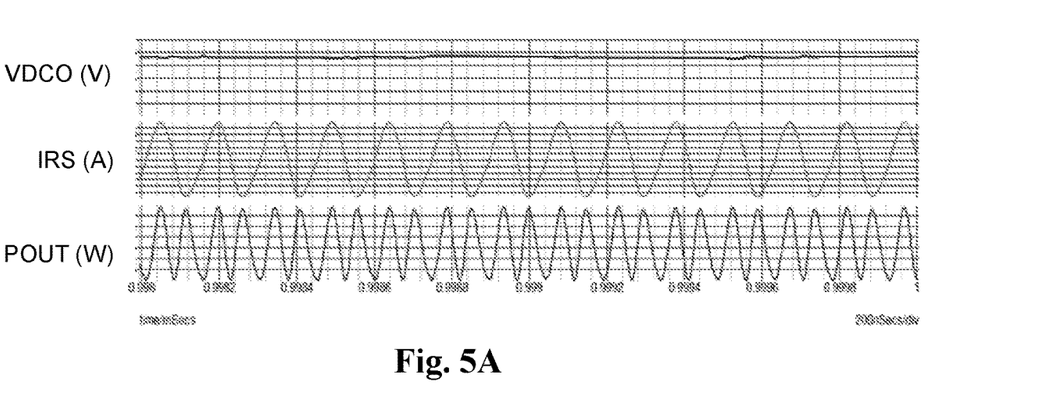
FIGS. 5A and 5B show simulation waveforms corresponding to the embodiments shown in FIGS. 2 and 3.
Figure 5B:
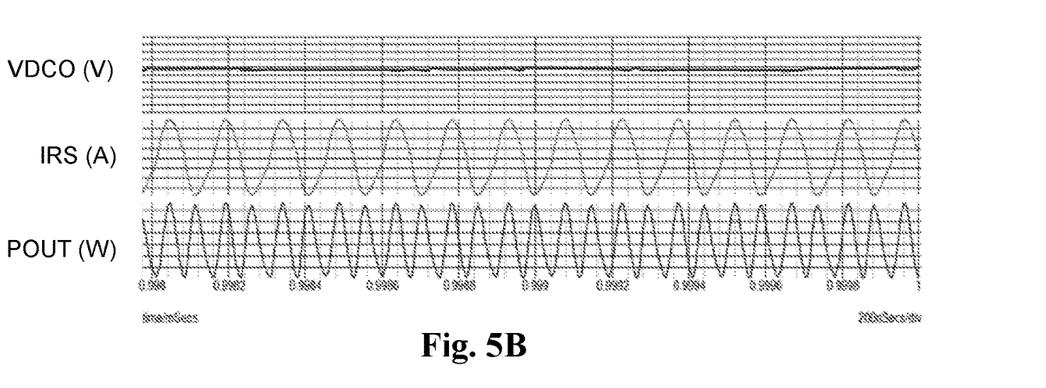

FIGS. 5A and 5B show simulation waveforms corresponding to the embodiments of FIG. 2 or 3, wherein FIGS. 5A and 5B show simulation waveforms, in time domain, of the reflected resistance of the resonant transmitter circuit being 25 ohm and 55 ohm respectively, wherein the voltages of the input power PIN are both 12V and the operating frequencies are both 6.78 MHz. In the embodiments as shown in FIGS. 5A and 5B, the conversion output voltage VDCO and the resonant current IRS are substantially inverse proportional to each other as mentioned earlier, that is, the resonant current IRS increases when the conversion output voltage VDCO decreases (as shown in FIG. 5A), and the resonant current IRS decreases when the conversion output voltage VDCO decreases (as shown in FIG. 5B). The substantially inverse proportion relationship between the conversion output voltage VDCO and the resonant current IRS keeps the resonant wireless power POUT substantially at a fixed power regardless whether the reflected resistance of the resonant transmitter circuit is either 25 ohm or 55 ohm, thus the constant power mode is achieved (e.g. average about 16 W both in FIGS. 5A and 5B).

Figure 6:
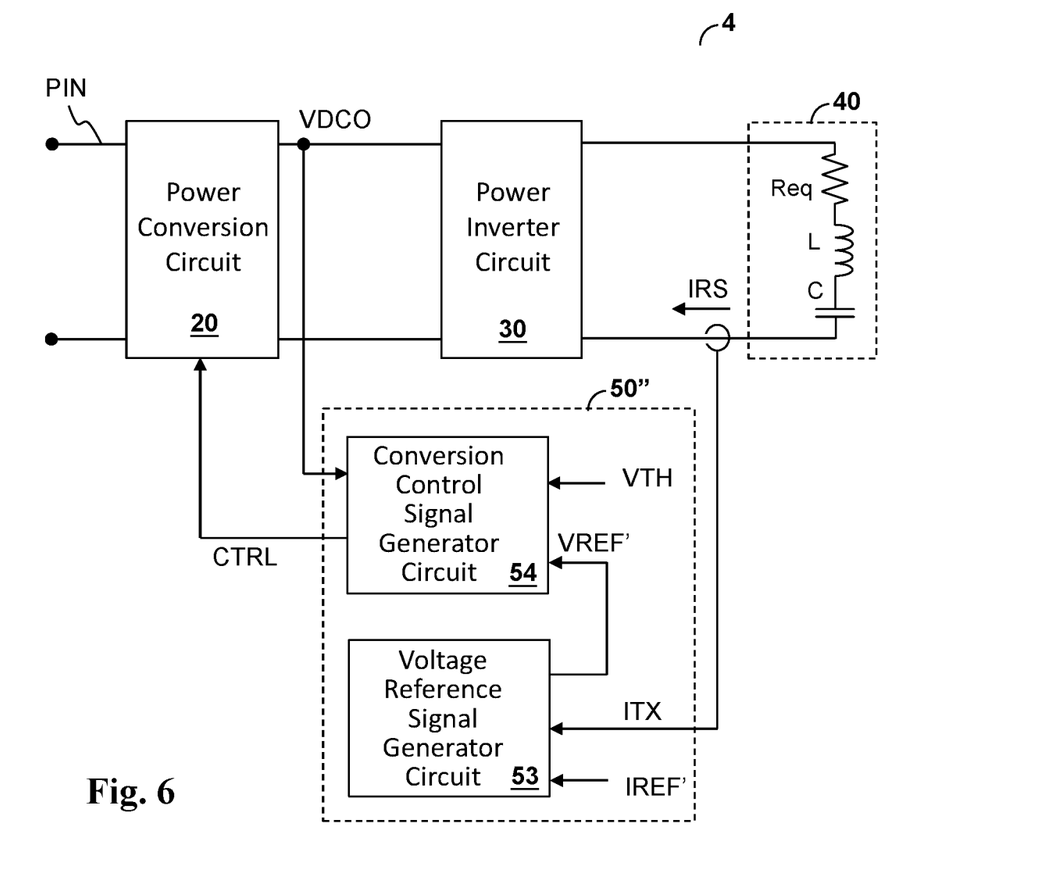
FIG. 6 shows a schematic diagram of an embodiment of the wireless power transmitter circuit according to the present invention.

Referring to FIG. 6 which shows a schematic diagram of another embodiment of the wireless power transmitter circuit (wireless power transmitter circuit 4) according to the present invention, this embodiment is similar to the wireless power transmitter circuit 2 in FIG. 2, but is different in that the power control circuit 50" generates a voltage reference signal VREF' according to the resonant current related signal ITX, and generates a conversion control signal CTRL according to a difference between the conversion output voltage VDCO and the voltage reference signal VREF'. The power conversion circuit 20 is controlled by the conversion control signal CTRL and this embodiment is able to achieve all the functions of the aforementioned embodiments, including the constant power mode (i.e. regulating the AC output power PACO or the conversion output power substantially at a predetermined second power level), or the constant current mode (i.e. regulating the resonant current IRS or the AC output current IAC substantially at a predetermined current level).

More specifically, in this embodiment, the power control circuit includes a voltage reference signal generator circuit 53 and a conversion control signal generator circuit 54. The voltage reference signal generator circuit 53 generates a voltage reference signal VREF' according to a reference current signal IREF' and the resonant current related signal ITX. The conversion control signal generator circuit 54 generates the conversion control signal CTRL according to a difference between the voltage reference signal VREF' and the conversion output voltage VDCO to control the power conversion circuit 20 to achieve the aforementioned functions (e.g. regulating the resonant wireless power POUT substantially at a predetermined power level, etc.). In one embodiment, the conversion control signal generator circuit 54 determines whether the wireless power transmitter circuit should operate in the constant power mode or the constant current mode operation according to a predetermined voltage threshold VTH. For example, when the conversion output voltage VDCO is lower than the predetermined voltage threshold VTH, the resonant current IRS or the AC output current IAC is regulated substantially at the a predetermined current level, and when the conversion output voltage VDCO is higher than the predetermined voltage threshold VTH, the conversion output power or the AC output power PACO is regulated substantially at the a predetermined power level.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. As an example, the "constant current mode" and the "constant power mode" can be used together, such that the wireless power transmitter circuit can have these two functions at the same time. As another example, the "constant current mode for the resonant current IRS" and the "constant power mode for the AC output power PACO" can be used together, such that the wireless power transmitter circuit can operate in these two modes to meet corresponding requirements. Note that the wireless power transmitter circuit may include the corresponding circuits described in the aforementioned embodiments to realize the combinations as above. Furthermore, those skilled in this art can readily conceive variations and modifications within the spirit of the present invention. For example, in the embodiment shown in FIG. 3, though current mode circuits (for example but not limited to the transconductance amplifier circuit 511 and the current-voltage conversion circuit 512) are used as illustration, voltage mode circuits can be used to realize the same functions according to the spirit of the present invention. As another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A wireless power transmitter circuit, comprising:
   a power conversion circuit, configured to operably convert an input power to a conversion output power, wherein the conversion output power includes a conversion output voltage;
   a power inverter circuit, configured to operably convert the conversion output power to an AC output power, wherein the AC output power includes an AC output current;
   a resonant transmitter circuit which includes at least a transmitter coil, and is configured to operably convert the AC output power to a resonant wireless power, wherein the resonant transmitter circuit has a resonant current; and
   a power control circuit consisting of analog circuit components, configured to operably generate a current reference signal according to the conversion output voltage, and generate a conversion control signal according to a difference between the current reference signal and a signal related to the resonant current (resonant current related signal), so as to control the power conversion circuit by the conversion control signal to regulate the resonant wireless power substantially at a predetermined first power level, wherein the power control circuit generates the current reference signal and generates the conversion control signal by the analog circuit components.

2. The wireless power transmitter circuit of claim 1, wherein the power control circuit includes:

a current reference signal generator circuit, configured to operably generate the current reference signal according to a reference voltage and the conversion output voltage; and a conversion control signal generator circuit, configured to operably generate the conversion control signal according to a difference between the current reference signal and the resonant current related signal.

3. The wireless power transmitter circuit of claim 1, wherein the resonant current decreases when the conversion output voltage increases, and the resonant current increases when the conversion output voltage decreases.

4. The wireless power transmitter circuit of claim 1, wherein the conversion control signal controls the power conversion circuit to regulate the AC output power or the conversion output power substantially at a predetermined second power level which is related to the first power level.

5. The wireless power transmitter circuit of claim 1, wherein the power conversion circuit is a switching buck converter circuit, a switching boost converter circuit, a switching buck-boost converter circuit, or an AC-DC converter circuit.

6. The wireless power transmitter circuit of claim 1, wherein the power inverter circuit is a class D inverter circuit, or a class E inverter circuit.

7. The wireless power transmitter circuit of claim 1, wherein the conversion control signal controls the power conversion circuit to regulate the resonant current or the AC output current substantially at a predetermined current level when the conversion output voltage is lower than a predetermined voltage threshold.

8. The wireless power transmitter circuit of claim 7, wherein the power control circuit includes:
   a transconductance amplifier circuit, configured to operably generate a transconductance amplification output signal according to a reference voltage and the conversion output voltage;
   a unidirectional conductive device, having a current output terminal which is coupled to the transconductance amplification output signal, and having a current input terminal at which the current reference signal is generated; and
   a signal amplifier circuit, configured to operably generate the conversion control signal according to a difference between the current reference signal and the resonant current related signal.

9. The wireless power transmitter circuit of claim 8, wherein the predetermined voltage threshold is the reference voltage.

10. A power control circuit, configured to operably control a wireless power transmitter circuit which comprises: a power conversion circuit, configured to operably convert an input power to a conversion output power, wherein the conversion output power includes a conversion output voltage; a power inverter circuit, configured to operably convert the conversion output power to an AC output power, wherein the AC output power includes an AC output current; and a resonant transmitter circuit which includes at least a transmitter coil, and is configured to operably convert the AC output power to a resonant wireless power, wherein the resonant transmitter circuit has a resonant current; the power control circuit comprising:
   a current reference signal generator circuit consisting of first analog circuit components, configured to operably generate a current reference signal according to a reference voltage and the conversion output voltage,
   wherein the current reference signal generator circuit generates the current reference signal by the first analog circuit components; and
   a conversion control signal generator circuit consisting of second analog circuit components, configured to operably generate a conversion control signal according to a difference between the current reference signal and a signal related to the resonant current (resonant current related signal), so as to control the power conversion circuit by the conversion control signal to regulate the resonant wireless power substantially at a predetermined first power level, wherein the conversion control signal generator circuit generates the conversion control signal by the second analog circuit components.

11. The power control circuit of claim 10, wherein the resonant current decreases when the conversion output voltage increases, and the resonant current increases when the conversion output voltage decreases.

12. The power control circuit of claim 10, wherein the conversion control signal controls the power conversion circuit to regulate the AC output power or the conversion output power substantially at a predetermined second power level which is related to the first power level.

13. The power control circuit of claim 10, wherein the conversion control signal controls the power conversion circuit to regulate the resonant current or the AC output current substantially at a predetermined current level when the conversion output voltage is lower than a predetermined voltage threshold.

14. The power control circuit of claim 13, wherein the current reference signal generator circuit includes:
   a transconductance amplifier circuit, configured to operably generate a transconductance amplification output signal according to a reference voltage and the conversion output voltage;
   a unidirectional conductive device, having a current output terminal which is coupled to the transconductance amplification output signal, and having a current input terminal at which the current reference signal is generated; and
   a signal amplifier circuit, configured to operably generate the conversion control signal according to a difference between the current reference signal and the resonant current related signal.

15. The power control circuit of claim 14, wherein the predetermined voltage threshold is the reference voltage.

16. A control method, for use in controlling a wireless power transmitter circuit which comprises: a power conversion circuit, configured to operably convert an input power to a conversion output power, wherein the conversion output power includes a conversion output voltage; a power inverter circuit, configured to operably convert the conversion output power to an AC output power, wherein the AC output power includes an AC output current; and a resonant transmitter circuit which includes at least a transmitter coil, and is configured to operably convert the AC output power to a resonant wireless power, wherein the resonant transmitter circuit has a resonant current; the control method comprising:
   generating a current reference signal according to the conversion output voltage by means of a first circuit consisting of first analog circuit components;
   generating a conversion control signal according to a difference between the current reference signal and a resonant current related signal by means of a second circuit consisting of second analog circuit components; and controlling the power conversion circuit by the conversion control signal to regulate the resonant wireless power substantially at a predetermined first power level.

17. The control method of claim 16, wherein the resonant current decreases when the conversion output voltage increases, and the resonant current increases when the conversion output voltage decreases.

18. The control method of claim 16, further comprising: controlling the power conversion circuit to regulate the AC output power or the conversion output power substantially at a predetermined second power level which is related to the first power level.

19. The control method of claim 16, further comprising: controlling the power conversion circuit to regulate the resonant current or the AC output current substantially at a predetermined current level when the conversion output voltage is lower than a predetermined voltage threshold.

20. The power control circuit of claim 19, wherein the step of generating the current reference signal includes:
   generating an amplification output signal according to a difference between a reference voltage and the conversion output voltage; and
   generating the current reference signal by unidirectionally conducting the amplification output signal.

21. The control method of claim 20, wherein the predetermined voltage threshold is the reference voltage.

* * * * *